United States Patent [19]

Meschi

[11] Patent Number: 5,178,506
[45] Date of Patent: Jan. 12, 1993

[54] AUTOMATIC SERVICE APPARATUS FOR FAST PRINTING

[75] Inventor: Luciano Meschi, Castiglioncello, Italy

[73] Assignee: Industria Grafica Maschi, S.r.l., Livorno, Italy

[21] Appl. No.: 662,739

[22] Filed: Mar. 1, 1991

[30] Foreign Application Priority Data

Mar. 1, 1990 [IT] Italy ............................ 19529 A/90
May 22, 1990 [IT] Italy ............................ 21221 B/90
Nov. 5, 1990 [IT] Italy ............................ 22054 B/90

[51] Int. Cl.$^5$ ............................................. B65G 1/04
[52] U.S. Cl. ............................... 414/268; 414/281;
414/741; 414/225; 414/788; 901/31; 271/221;
294/103.1
[58] Field of Search .................. 414/1, 225, 226, 266,
414/267, 268, 277, 279, 281, 283, 741, 790.2,
788; 901/31; 271/221; 294/103.1

[56] References Cited

U.S. PATENT DOCUMENTS

| | | | |
|---|---|---|---|
| 3,504,808 | 4/1970 | Carabateas | 414/283 |
| 3,822,025 | 7/1974 | Loos | 414/281 X |
| 4,203,694 | 5/1980 | James | 414/788 |
| 4,557,655 | 12/1985 | Berg | 414/226 X |
| 4,626,013 | 12/1986 | Barrows | 414/741 X |
| 5,015,139 | 5/1991 | Baur | 414/281 |

FOREIGN PATENT DOCUMENTS

3022173 12/1981 Fed. Rep. of Germany ........ 901/31
0770790 10/1980 U.S.S.R. .................... 901/31

OTHER PUBLICATIONS

Patent Abstracts of Japan, vol. 14, No. 83 (M-93), Feb. 16, 1990 & JP A 1 299 126 (Chihiro) Dec. 1, 1989.
Patent Abstracts of Japan, vol. 13, No. 385 (M-864) Aug. 25, 1989 & JP-A-1 135 436 (Masakane).
Patent Abstracts of Japan, vol. 4, No. 150 (M-37) Oct. 22, 1980 & JP-A-55 101 536 (Kazuo) Aug. 2, 1980.
Patent Abstracts of Japan, vol. 12, No. 134 (M-689) Apr. 23, 1988 & JP-A-62 255 327, (Hiroshi) Nov. 7, 1987.
Patent Abstracts of Japan, vol. 9, No. 242 (M-417) Sep. 28, 1985 & JP-A-60 094 235 (Yasuo) May 27, 1985.
Patent Abstracts of Japan, vol. 9, No. 294 (M-431) Nov. 20, 1985 & JP-A-60 132 849 (Kouzuo) Jul. 15, 1985.
Patent Abstracts of Japan, vol. 10, No. 81 (M-465) Mar. 29, 1986 & JP-A-60 222 376 (Kengo) Nov. 6, 1985.

*Primary Examiner*—David A. Bucci
*Assistant Examiner*—James Keenan
*Attorney, Agent, or Firm*—McAulay Fisher Nissen Goldberg & Kiel

[57] ABSTRACT

Automatic service apparatus for fast printers (10) including a store (12) containing reams of papers to be printed, a mechanical arm (16), equipped with pliers (24), movable among a plurality of boxes (14) for drawing reams from the store (12), unpacking and aligning sheets from the ream, depositing one of the reams into a sheet feeding seat of a printer (10), drawing groups of sheets from the output of the printer (10) and transferring the groups to an after-treatment station (60). The pliers can be provided with a static device for aligning the reams.

27 Claims, 13 Drawing Sheets

AUTOMATIC SERVICE APPARATUS FOR FAST PRINTING

The present invention relates to an automatic service apparatus for fast printers, such as the so-called laser printers, and more particularly, to an automatic service apparatus for delivering at the inlet of the laser printer single sheets of paper (in the form of reams) and for drawing printed sheets at the output of the printer for the further finishing operations, such as brochure formation.

The fast printers, such as laser printers, are now quite extensively entering into current use especially in the case of paper treatment lines, such as service lines of data processing centers and accounting centers, because the processing speed of the computing units requires a fast data print on a paper support.

These printers are usually provided with paper, such as a continuous form, typically made up of a plurality of sheets or forms, connected to form a continuous strip and collected in the form of accordion refolded packages, or of a continuous paper strip drawn from a feeding coil of the kind so-called pre-worked, wherein the paper had been previously equipped with driving lateral holes, weakened transverse and longitudinal punched lines for separation by tearing and preprinted portions for example with fixed register data, typical of the final product coming from the line.

In some cases it is, however, desirable to provide the printer with single sheets, rearranged in reams, in the same manner which as fed in a conventional photocopying machine.

However, in the case of fast printers and particularly laser printers, the printer operating speed (of the order of something less than two sheets per second) makes it necessary for the permanent presence of an operator because the printer at very short time intervals (considering that the reams on the average contain 500 sheets) requires a new ream when the preceding one is exhausted.

In addition to this problem, which turns into an unacceptable increase in costs if we consider the influence on the costs of labor for any industrial or commercial processing is considered, there is also the problem of the extreme operating sensitivity and delicacy of the laser printer. Therefore, even a minimum misalignment of the sheets in the reams causes printer jamming and eventually a stopping of the printer and the whole line stopping therewith.

In the case, for example, of invoicing accounting centers, such as of companies giving services for public utility, and with a bi-monthly (two months) or monthly expiration, to have issue a very high number of invoices addressed to the consumers, it is obvious that these difficulties heavily affect line productivity.

Another problem, of no negligible importance, is the one about service centers which servicing of several customers or users, wherein currently, once work for a first customer is completed, it is necessary to commence the work for a second customer, wherefore until now is was necessary to stop the line and to substitute the paper upstream fed into the printer with another one bearing, for example, the new heading and a different graphic set invoices.

These problems have till now held back in a very considerable measure the diffusion of the fast printers fed by reams of single sheets, except in cases of particular requirements.

A further problem, in common with all the kinds of lines for handling printed paper supports, occurs downstream with respect to the fast printer principally or mainly after the tearing separation of single sheets or forms from a continuous strip originally fed onto the fast printer. The printed sheets, in fact, very often have to be brochured, such a term including operations which range from the simple and trivial stapling to the applications of covers, possibly transparent, equipped with a sticker which is, for example, hot activated.

Also for this case it is necessary for the intervention of an operator assigned to that operation.

The main object of the present invention is to provide an automatic service apparatus for fast printers which include a store containing at least one paper ream to be printed, which protrudes, along one of the edges, with respect to the supporting a substantially horizontal surface for a predetermined distance, a mechanical robot arm, equipped with plier means and movable among a plurality of positions, in the first of which said plier means are adapted to draw said ream from said store at said protruding edge, and in a second position said robot arm is inclined with a cavity defined by said plier means upwardly turned for unpacking and alignment operations of sheets along one edge of said cavity of said plier means, and in a third position said robot arm is suitable to put said ream into a feeding seat of the fast printer, and in a fourth position said robot arm is suitable to draw a prefixed number of printed sheets outgoing from said fast printer to transfer them to an after-treatment station, said plier means of said robot arm being equipped with a first lateral temporary clamp means of said cavity formed by said plier means, second means to impart a vibratory motion to said walls of said cavity when said robot arm is found in said second position, and third means for the reciprocal approach and moving away of the two parallel and horizontal planes forming said plier means.

Alternatively, the service apparatus for fast printers according to this invention is provided with a plier comprising two parallel plates, a first fixed plate and a second movable plate movable perpendicularly with respect to said fixed plate, two lateral panels which can rotate around a hinge axis which, in conjunction with said fixed plate, form a box cavity to contain a ream of sheets wherein at least one of said panels comprises at least an envelope connected with an air intake, said envelope having a plurality of apertures turned to the reams of sheets to convey air jets against one edge of said ream of sheets.

Preferably, said envelope is made up of a series of small pipes parallelly connected by at least one manifold and the apertures are small holes.

According to a preferred embodiment, the panel, in its operative position to convey said air jets against the corresponding edge of the reams of sheets, is provided with a striking motion against the lateral edge of the reams and/or parallel plates.

Preferably, said striking motion is generated by a stepping motor or a pneumatic system and transmitted to the panel through a stiff extension which connects the panel to its own hinge.

In addition, said service apparatus is provided with a realignment device consisting of a square support provided to press on two adjacent and reciprocally perpendicular faces of a ream of sheets without pressing on the corner and leaving the possibility of examination of the pressed faces.

Specifically, said square support consists of a supporting frame, including two perpendicular branches, bringing two transparent bearing plates applied thereon placed generally directed like said two branches and reciprocally spaced so as not to touch each other along a corner corresponding to the corner of the squared frame in order to let a corner of the ream penetrate into the corner of the frame.

More specifically, said two transparent bearing plates are two glass sheets secured by screws to said supporting frame.

Alternatively, said transparent bearing plates are sheets of transparent plastic material.

Preferably, said transparent plastic material consists of polycarbonate resin.

Further alternatively, said bearing plates are made up of metal plates with substantially smooth bearing surfaces provided with apertures so as to enable an examination of the edges of the ream pressed by the plates.

Preferably, said metal plates are provided with aligned rectangular apertures so close to each other to take the appearance of a metal grill having smooth trimmed bearing surfaces, More preferably, the apertures of the plates are square.

The specific characteristic, features, and the advantages of the present invention will appear more clearly and evident from the following description of one form of a preferred embodiment thereof, in an exemplifying but not limitative way, with reference to the accompanying drawing, wherein.

Figure 1:
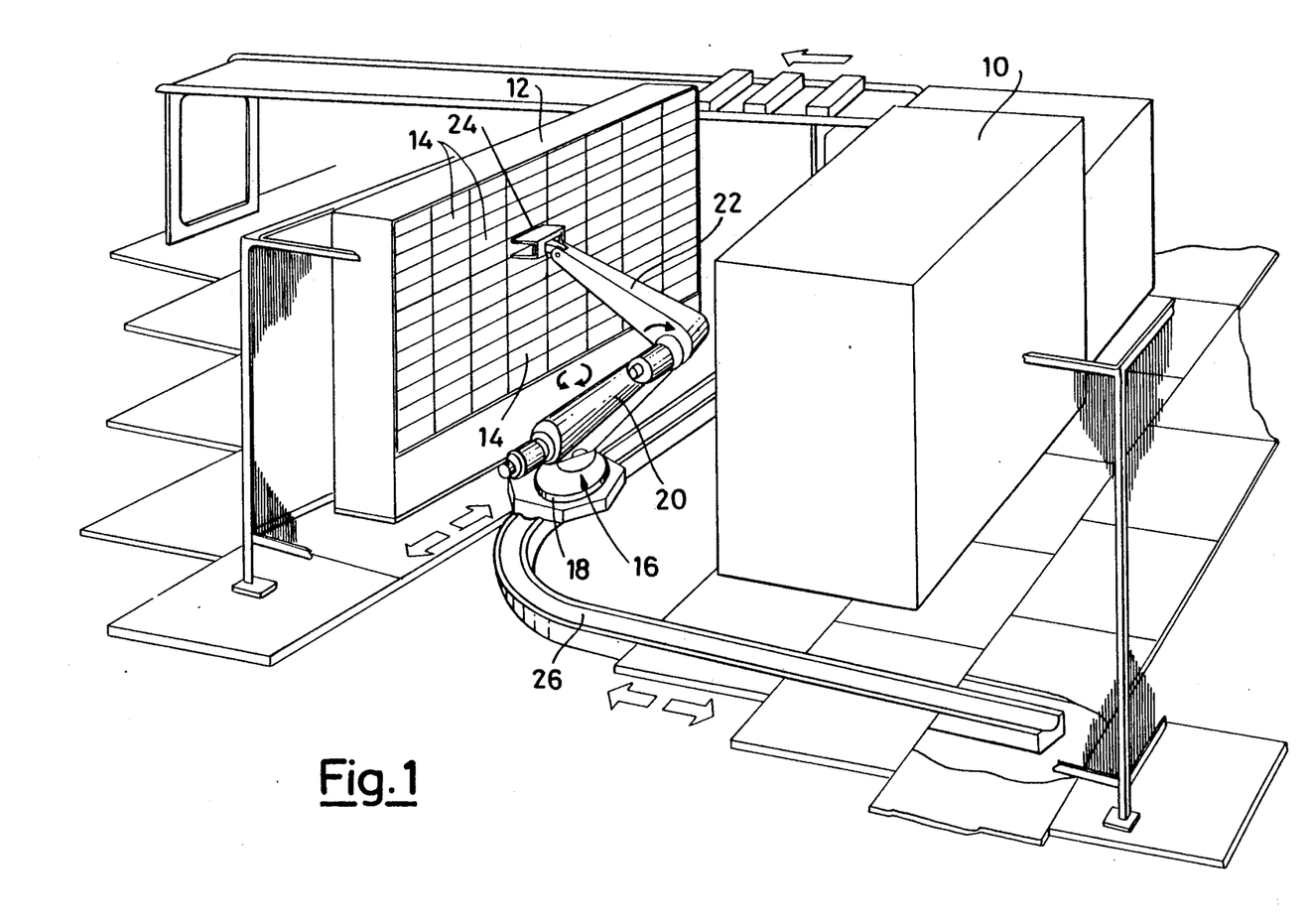
FIG. 1 is an overall schematic view of an automatic service apparatus according to the invention.

Referring now mainly to FIG. 1, reference number 10 generically indicates and shows a fast printer, like a laser printer. In front of the supply side (not shown) is arranged a store 12 of reams of paper which in this form of embodiment includes a number of boxes 14 suitable to secure an operating autonomy of some hours. Preferably the store 12 is mounted on wheels, wherefore, when it is finished, it can be replaced with another similar store previously charged with paper reams.

Between the store 12 and the printer 10 is arranged a robot arm group, generically and as a whole indicated by numeral 16 and including a base 18, a first arm 20 and a second arm 22, the last one having plier means 24. The base 18 is motorized and mounted on a rail 26 whereon the same base can be shifted to serve the printer 10.

Obviously the rail 26 may also be fitted, in order to have the group 16 serve subsequently more than one fast printer 10, evidently in accordance with the operative speed of each printer 10. The first arm 20 is pivotally mounted on the base 18, so that it can be traversed, while the second arm 22 pivots, at a first end thereof, on the end of the first arm 20, with a possibility of the second arm 22 to be rotated around the axis of the first arm 20 and therefore to rise or lower the plier means towards a position and not therefore a preselected box 14.

First plier means 24 (FIGS. 2-6) including substantially two plate jaws, 28 and 30 respectively, mounted on a supporting bracket 32; the jaw 28 is fixed and anchored to the base of the jaw 32, while the jaw 30 is L-shaped with the inoperative side 34 anchored to the jaw 32 in order to be able to slide along the same jaw in reciprocal approaching and moving away directions of jaws 28 and 30.

On both sides of the bracket 32 are rotatingly engaged two lateral or side panels 36 and 38, movable between an inactive or rest position (shown in FIG. 2) wherein they are back folded along the sides of the plier means and an operative or forward rotated position, in order to fit along the lower side with the adjacent lateral edge of the lower jaw 28 forming in this manner, in conjunction with the higher jaw 30, a box cavity 40, for the purpose which will be subsequently described. In turn, the bracket 32 is mounted on a box 42 wherein are housed operating mechanisms subsequently described. The box 42, in turn, is mounted by means of a pivot arm 44 on the end of the second arm 22 ending with two ears 46, between which the eyelet pivot 44 is fixed by a pivot 48 so that the box 42 can rotate by driving around the axis of the pivot 48.

Figure 2:
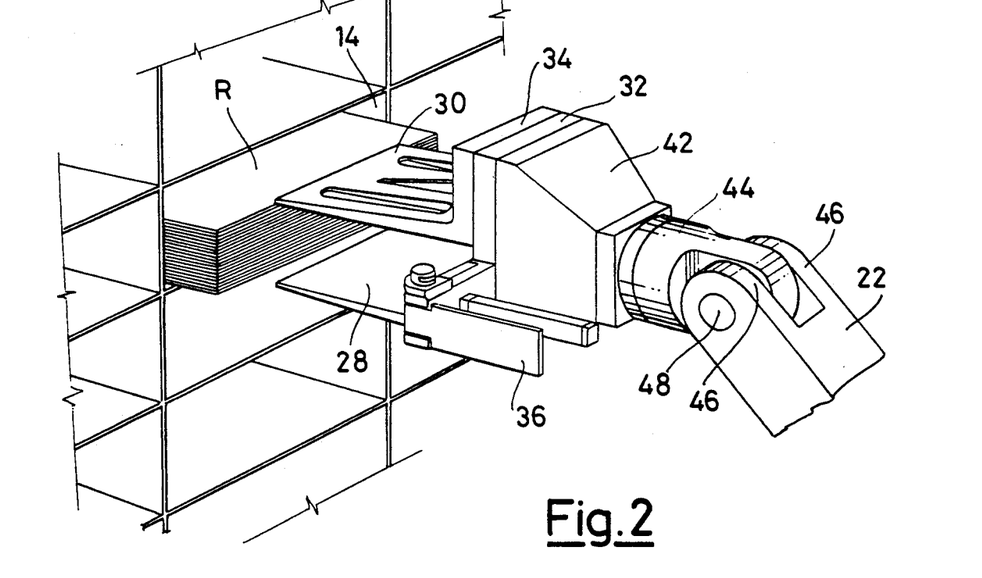
FIGS. 2 and 3 are respectively perspective and schematic views of the operative end of the robot arm in the step of a drawing of a ream of paper.
Figure 3:
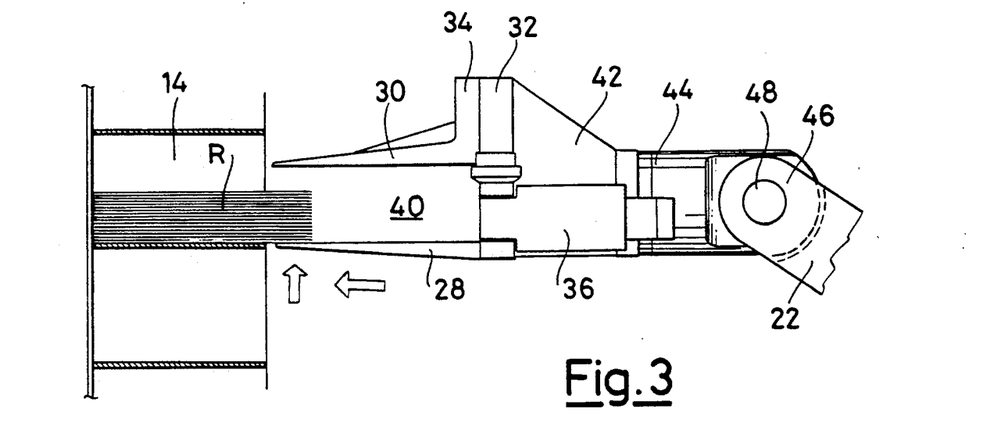

Inside the box 42 are housed the following operating mechanisms:

a) first motor means which driving vertical displacement of the jaw 30 towards vertical approach and moving away with respect to the fixed lower jaw 28;

b) second motor means for displacement of both panels 36 and 38 between the two positions, previously indicated;

c) third motor means to give a vibration motion; of desired frequency and amplitude, to the assembly including the jaws 28, 30 and the bracket 32;

d) fourth motor means for controlled rotation of the box 42 around the axis of the pivot 48;

e) fifth motor means for controlled rotation of the arm 22 with respect to the arm 20.

All these motor means as well as the mechanical arrangement and the specific mechanical features are not described in greater detail, being a matter of executive details within the capacity of the people skilled in the art, once the operations they have to provide are clearly identified.

For this purpose, the operation of the automatic apparatus according to the present invention will now be described.

When a ream of paper sheets is to be supplied to the laser printer 10, a control unit selects a box 14 of the store 12 wherefrom the aforesaid ream has to be drawn.

Accordingly, the group 18 is shifted in a position along the rail 26 as far as the box 14 is found in the range of action of the group itself. Of course, such a position is included in the drive predispositions of the apparatus according to the invention.

In this position of group 16, the arm 20 is traversed until it is brought with the end connected to the arm 22 in vertical alignment with the desired box 14, afterwards, by rotating the arm itself, the end plier means of the arm 22 are brought to the height of the regarded box 14.

As already mentioned and clearly visible in FIG. 2, the ream contained in the box 14 protrudes with a portion of its edge longer than the box itself in order to offer a grasping space for the jaws 28 and 30 which are in a wide apart condition approach, the box mouth itself, so that the fixed lower jaw is below the lower sheet of the ream of paper indicated by the reference R.

Under this condition the higher jaw 30 is operated by shifting towards the lower jaw as far as to grasp firmly the ream R which, if the width of the protruding edge of the box 14 is sufficient, it will be grasped without down folding, because the ream itself is grasped along its longer edge.

At this moment both lateral panels 36 and 38 are operated to rotate 180 degrees moving to their already mentioned operative position, wherein in conjunction with the lower jaw 28 form a box cavity, whose sizes are slightly greater than the ones of the ream of paper.

With the ream R contained at this step in the aforesaid box cavity, the box, or head, is upwardly rotated to have the lower jaw 28 upwardly inclined starting from its junction line with the bracket 32 and inclined to one side, that is to one of the parallel panels 36 or 38.

In this condition ream R abuts, even if it is not in a perfectly ordered and aligned manner, against the bottom of the box cavity and against one of the lateral panels.

If desired, in this condition a separated mechanism of unpacking, for example formed by a rotating shaft with flexible blades, may engage the free edge of the ream securing that the sheets do not remain too adherent preventing the subsequent single drawing by means of the printer mechanism.

Figure 4:
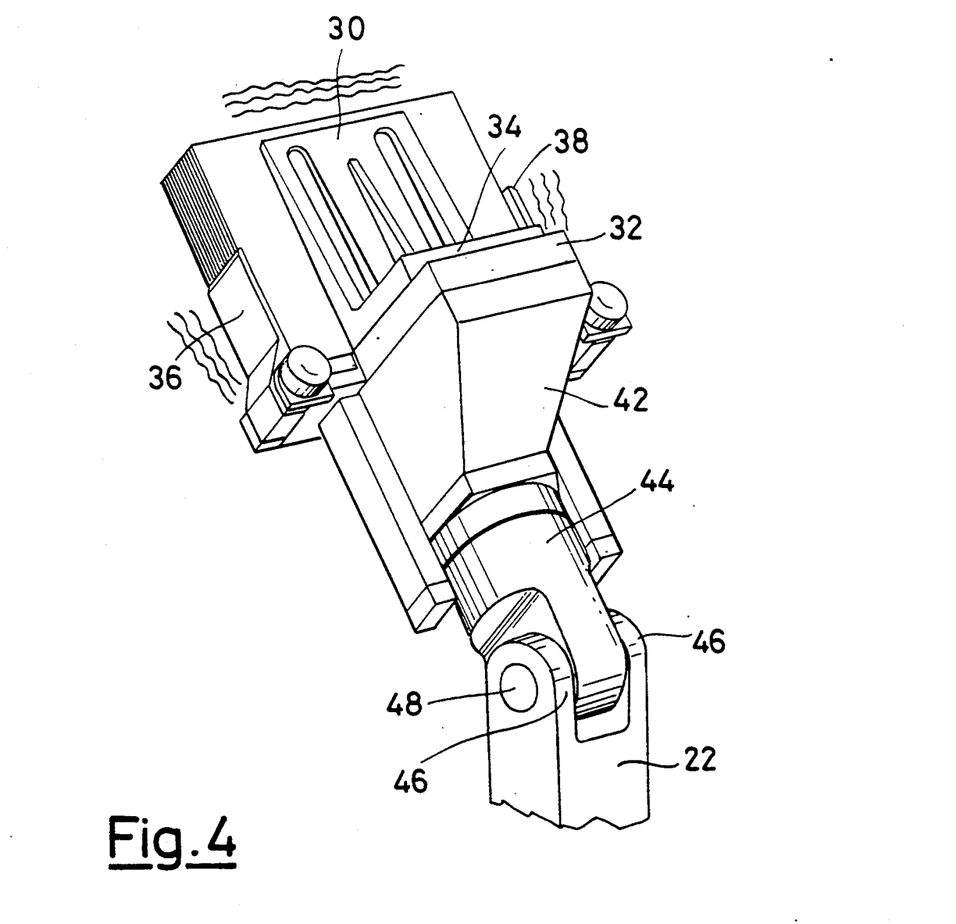
FIG. 4 is a perspective view of the same operative end of the robot arm in the vibration step to line up the sheets of a ream.

In the aforesaid condition, head 42 is applied with the already vibrating movement propagating from the walls of the box cavity to ream R which, for a well known effect and owing to the gravity, causes the setting of the ream with the edges of the sheets perfectly aligned with each other and defined to the 90 degree edges by the lateral panels and the bottom of the box cavity.

Figure 5:
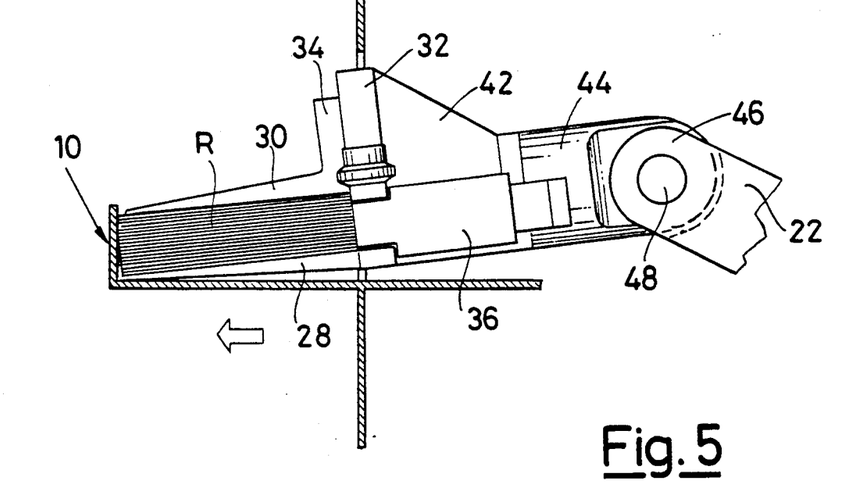
FIGS. 5 and 6 are views similar to those of FIGS. 3 and 3 of the feeding step of the fast printer with the ream of paper.
Figure 6:
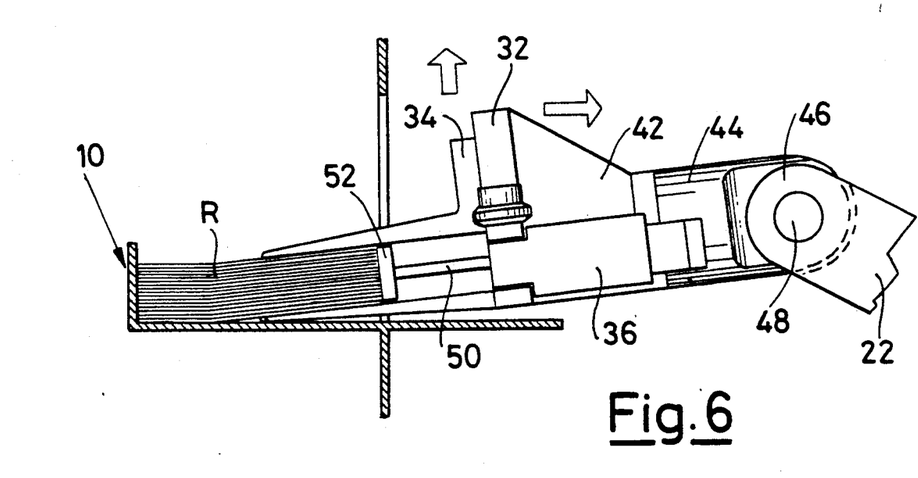

Once this operative step is completed, the higher jaw 30 is tightened against the lower jaw 28 grasping firmly the ream R which is therefore transferred to the supply inlet of the printer in the opening of which penetrates the assembly formed by both jaws and the ream.

At the beginning of the withdrawing movement of the jaws 28 and 30 from such an opening, a piston and cylinder device is activated whose stem 50 is integral with a sheet-pressing plate 52 extending for the whole height and length of the side of the ream defined by the bottom of the aforesaid box cavity, wherefor ream R is not withdrawn because of the outcoming from the jaws 28 and 30 from the supply opening of the printer 10.

As already mentioned in the preamble of the description of this invention, the robot arm group may be activated even in the step of manipulation of the printed sheets outcoming from the printer 10.

In fact, one of the features of the lines whereto the present invention is directed is the one which carries out works with a variable number of printed sheets, which seldom correspond to the number of sheets contained in the ream charged in the supply opening of the printer.

It is apparent that, once ended the group of printed sheets, these must be removed away and treated as a whole unit (job separation). For this purpose, in addition to equip the printer with a copy of receiving drawers 54 and 56 (FIG. 7), mounted on a structure 58 which allows the vertical transfer, so that one of them is always in a suitable position to receive printed sheets 10 outcoming from the printer 10, the concerned drawers are shaped, in order to allow the head 42 to bring both jaws 20 and 30 in free engagement with the packet of printer sheets present in the drawers itself.

Figure 7:
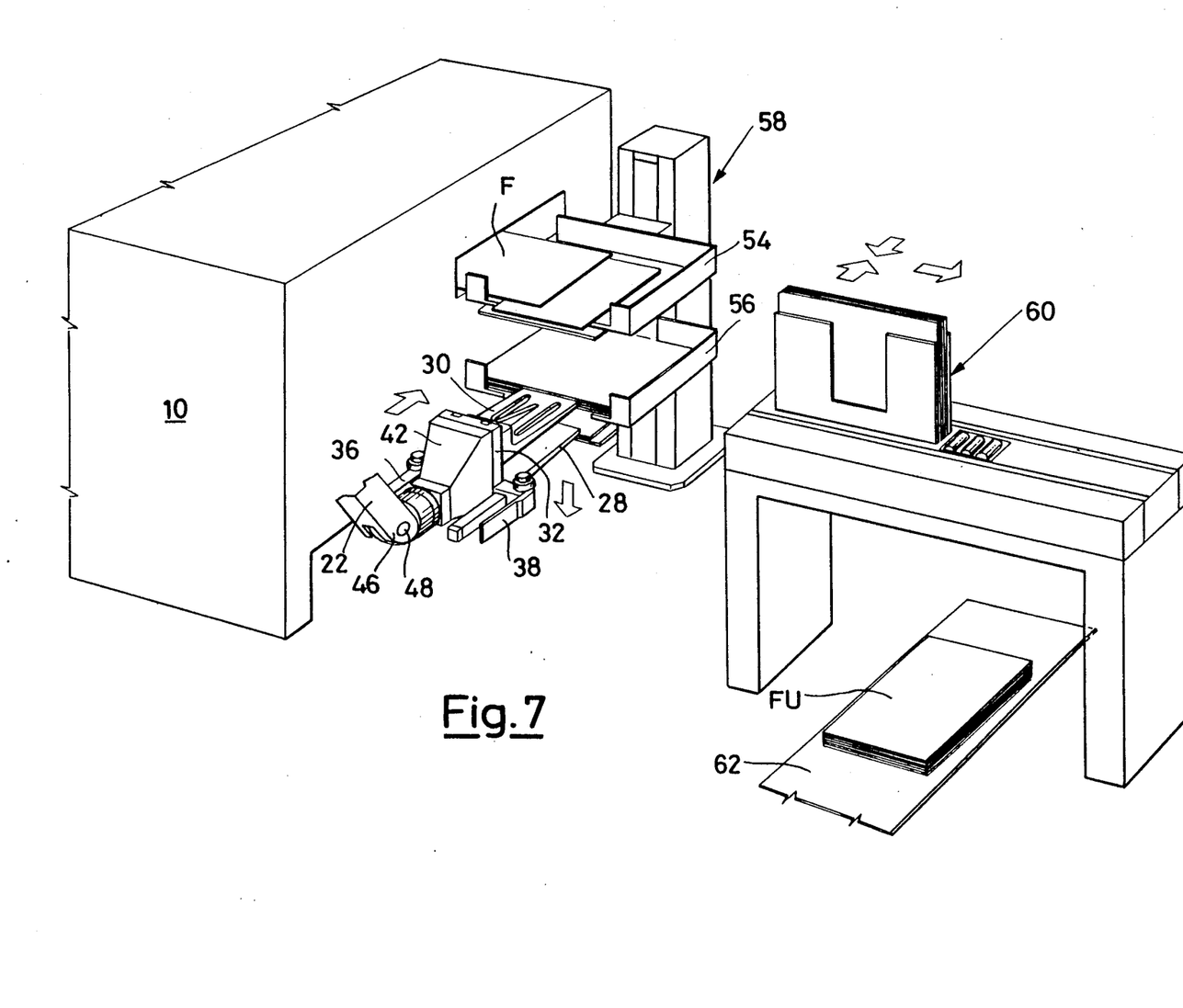
FIG. 7 is a schematic view similar to that of FIG. 1 of the output section of the fast printer and of the accessory operation.

Once grasped, the packet, the head 42 repeats the upward and lateral rotation movements, so that in the box cavity, reformed due to the operation of the panels 36 and 38, the packet itself is perfectly aligned along a larger side of it again due to the vibration motion applied by the box cavity.

Once this operation is completed, the group 16 provides for the transfer of the packet, firmly held between the jaws 28 and 30, to a finishing device, such as a brochure maker 60 of a well known type, or a stapling device, or the like.

From this last device the finished brochure FU is moved away from the line for example by means of a conveyor belt 62.

The versatility and reliability of the automatic apparatus according to the present invention will be apparent from the following description having many variations.

As an example of said plier means reference will be made to the embodiments shown in FIGS. 8 to 13, wherein, where it is possible, the same references of the preceding FIGS. 1-7 have been used.

Figure 8:
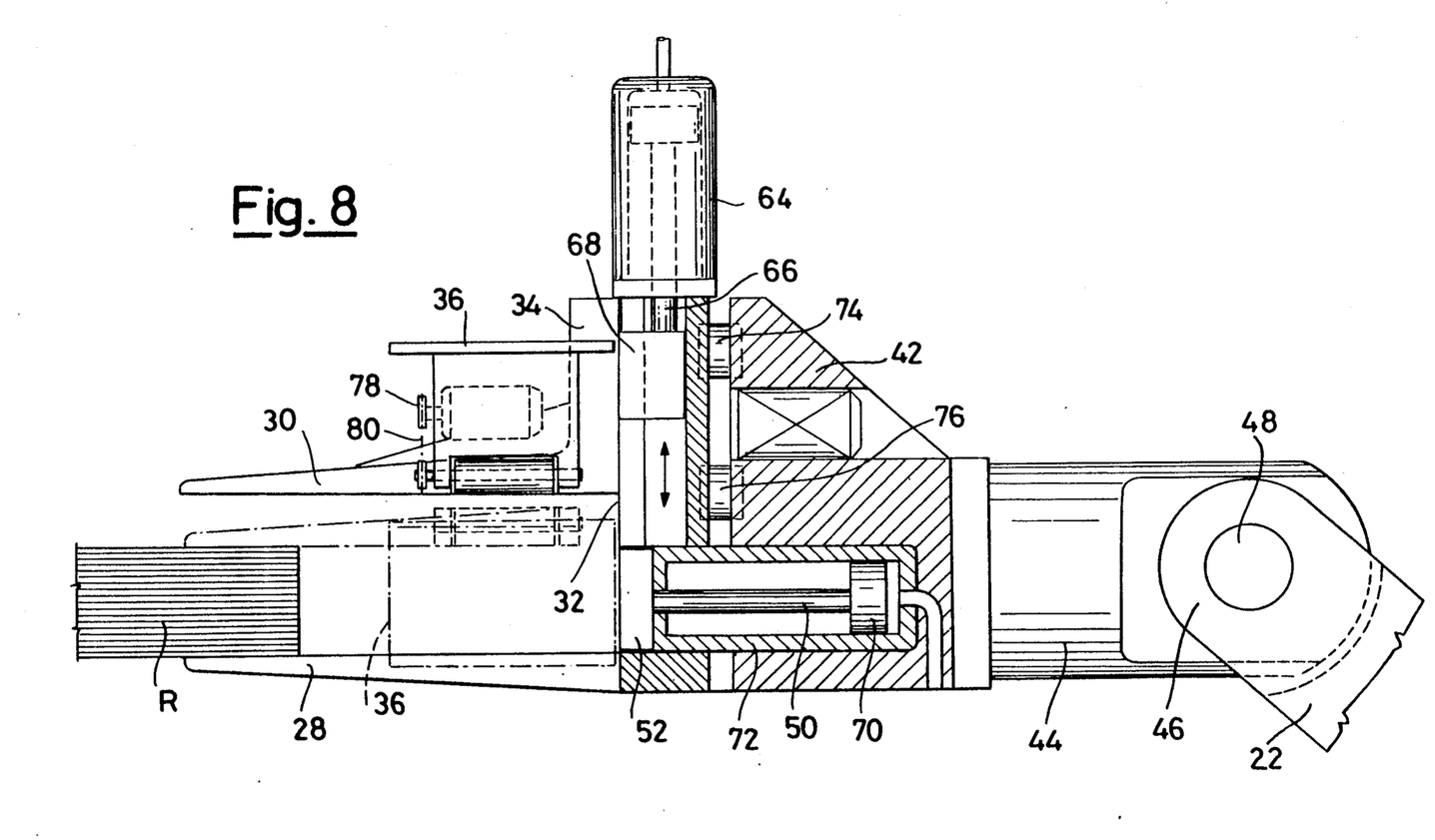
FIGS. 8 and 9 are respectively longitudinal and transverse sectional views, of the plier means, in accordance with a first variation of the embodiment.
Figure 9:
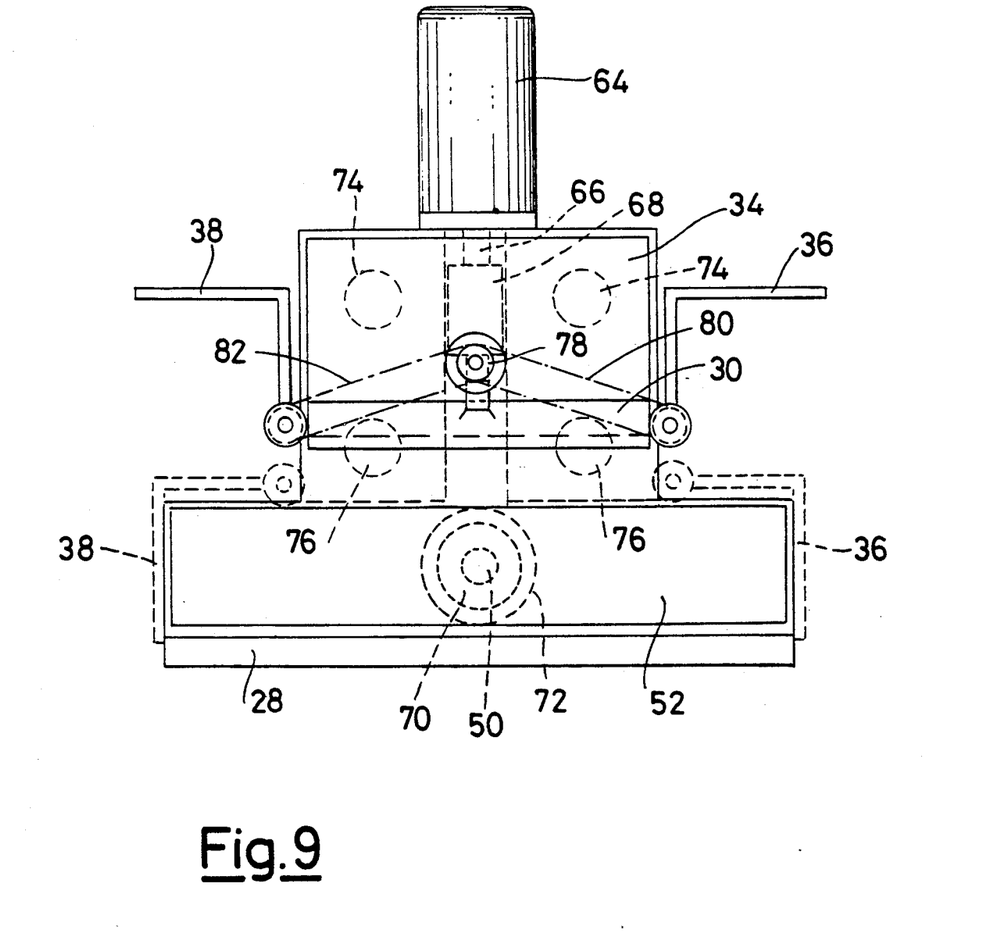

In this case the vertical stroke of the higher jaw 30 is driven by a pneumatic double-acting cylinder mechanism 64, whose piston, through a stem 66, drives the vertical transfer of a slide 68 integral with side 34 of the higher jaw 30.

For the operative displacement of the sheet-presser 52, the stem 50 is operated by a piston 70 associated to a cylinder 72.

In order to give a vibrating motion or movement to the jaws 28 and 30, there are provided two rubber pads or other elastic material 74 and 76 wherefor a movement applied to the head 42 is transmitted as a vibration to both jaws 28 and 30.

Finally, as concerns the rotating 180 degree movements of the lateral panels 36 and 38, which in this case are hinged to the fixed lower jaw 28, an electric motor 78 is provided which through small drive belts 80 and 82, in discordant motion towards each other causes a 180 degree rotation of the panels themselves by means of a mechanism integral to the rotation pivots.

Figure 10:
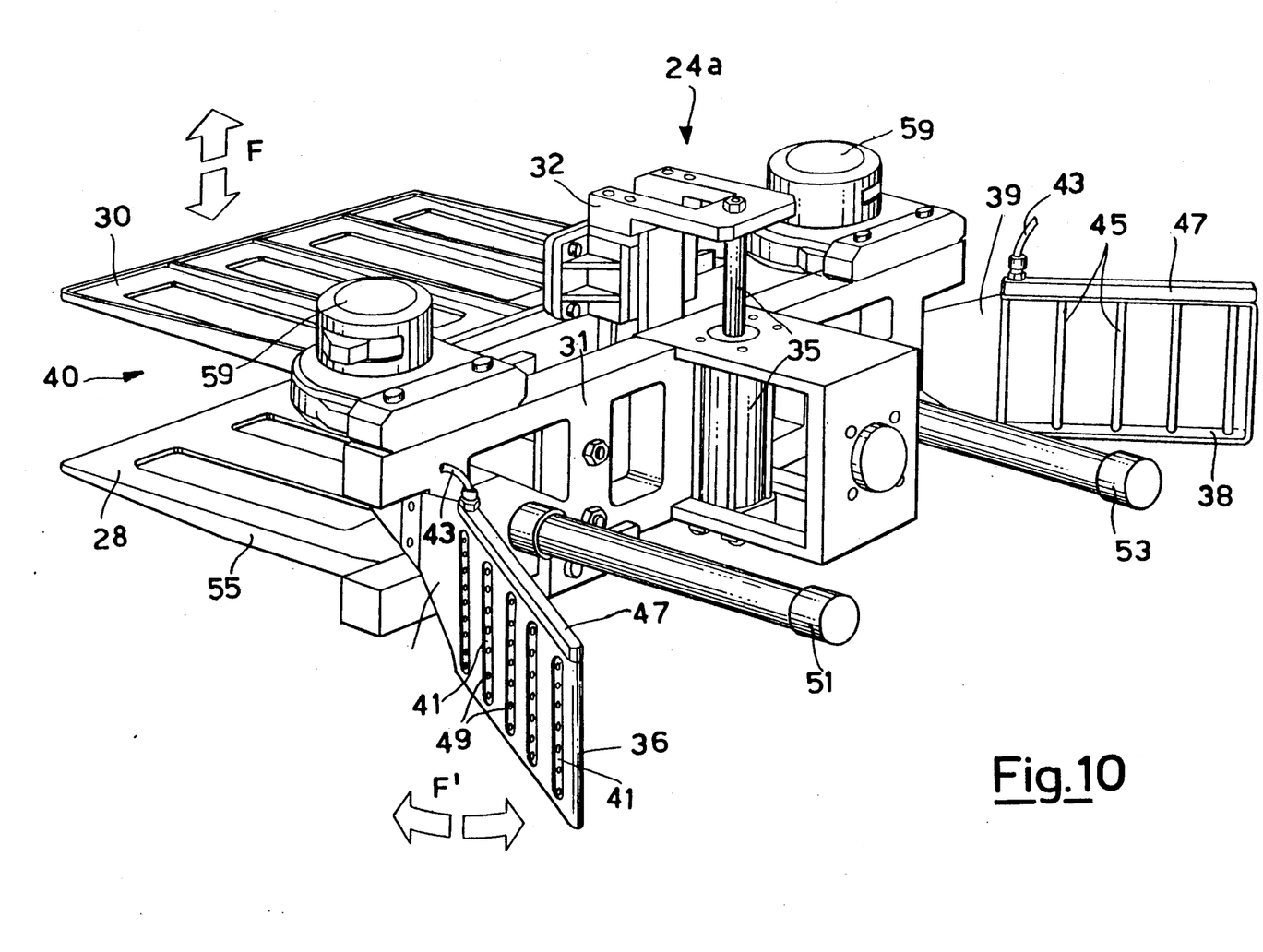
FIG. 10 is a perspective view of the plier means in a second embodiment.
Figure 13:
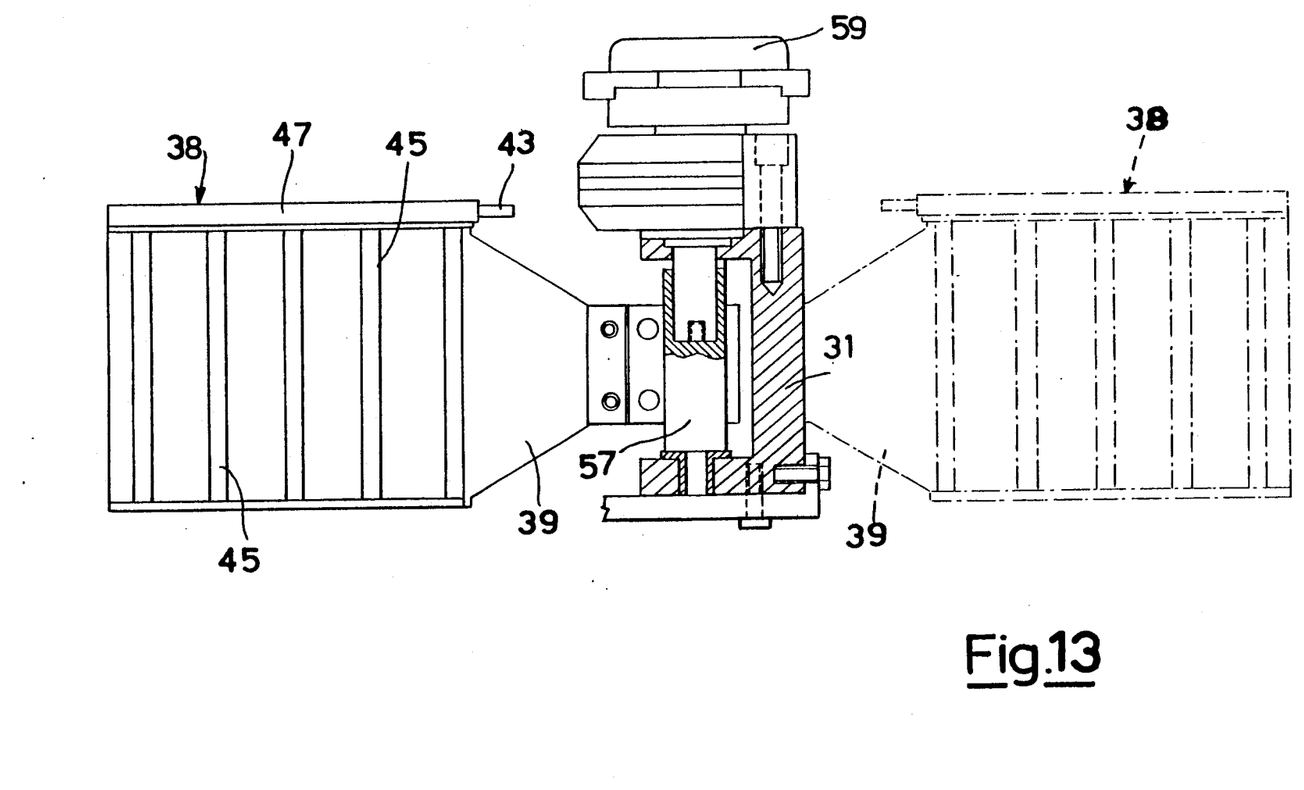
FIG. 13 is a schematic view of the plier of FIG. 10 partially in section according to the line 13—13.

Now with reference to FIGS. 10 and 13 a further plier generally indicated with reference numeral 24a includes substantially two plates or jaws 28, 30 mounted on a bracket 31, the jaw 28 being fixed and anchored to the base of the bracket, and the jaw 30 being fastened to a movable support 32 which runs along the bracket in approaching and moving away directions (F), driven by a cylinder-piston system 35.

On both sides of the bracket are rotatingly pivoted (F') two lateral panels 36, 38 movable between an inactive or rest position shown in FIG. 10, wherein they are back folded with respect to the sides of the plates 28, 30 and an operative position of forward rotated (see FIGS. 11 and 12) so as to fit together along the lower side with the lateral adjacent edge of the lower plate 28, forming in this way a box cavity 40 to contain a ream of sheets (not shown).

Reference numerals 51, 53 designate two cylinders with pistons to push the ream of sheets towards a desired position as already described in the preceding FIG. 6.

The lateral panels include an envelope 41 connected to an air intake 43 controlled by an electrovalve (not shown).

In the depicted example the envelope 41 is made up of a plurality of small parallel pipes 45 connected to a manifold 47; the small pipes represent a plurality of small holes or micro-holes 49, which, when the panels are in operative position (FIGS. 11 and 12), that is in close contact with the lateral edge 55 of the fixed plate 28, are directed to the box cavity 40 wherein is sheltered a ream of sheets addressed to be charged into the laser printer (not shown).

The lateral panels 36, 38 present a stiff, planar extension 39 which extend from the panel portion nearer to the bracket 31 to the pivot or hinge axis 57.

The pivot 57 is connected to or with a stepping motor 59 having the task to bring the panels into the desired position (inactive or operative) and, when said panels are in an operative position, to give them (through the pivot 75 and the planar extension 39) a boating movement against the ream of sheets sheltered in the box cavity 40 and/or against the edges of both jaws.

The stepping motor could be replaced with a mechanical system of eccentrics and cam shaft or a pneumatic system with a double-acting cylinder-piston.

Figure 11:
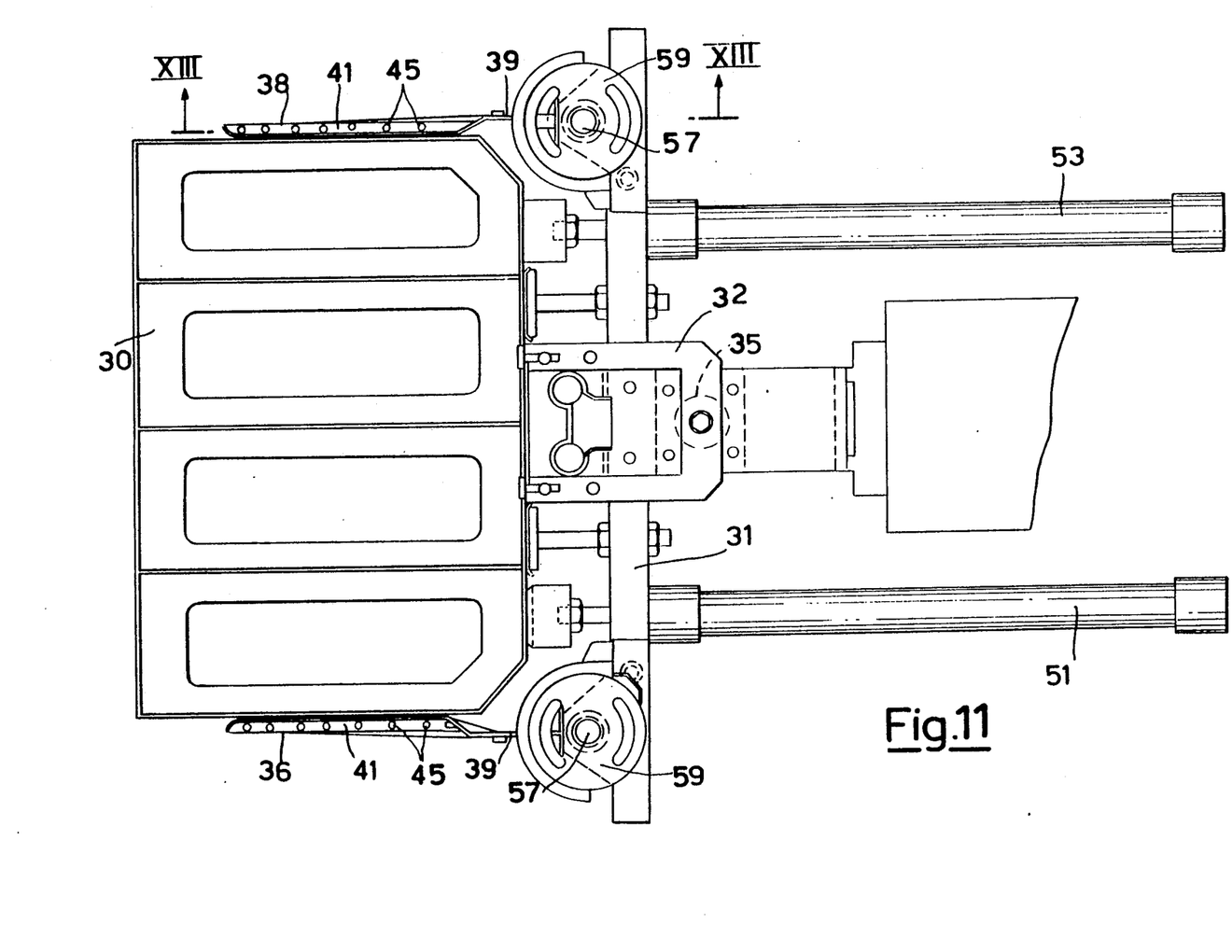
FIG. 11 is a plan view of the plier of FIG. 10.
Figure 12:
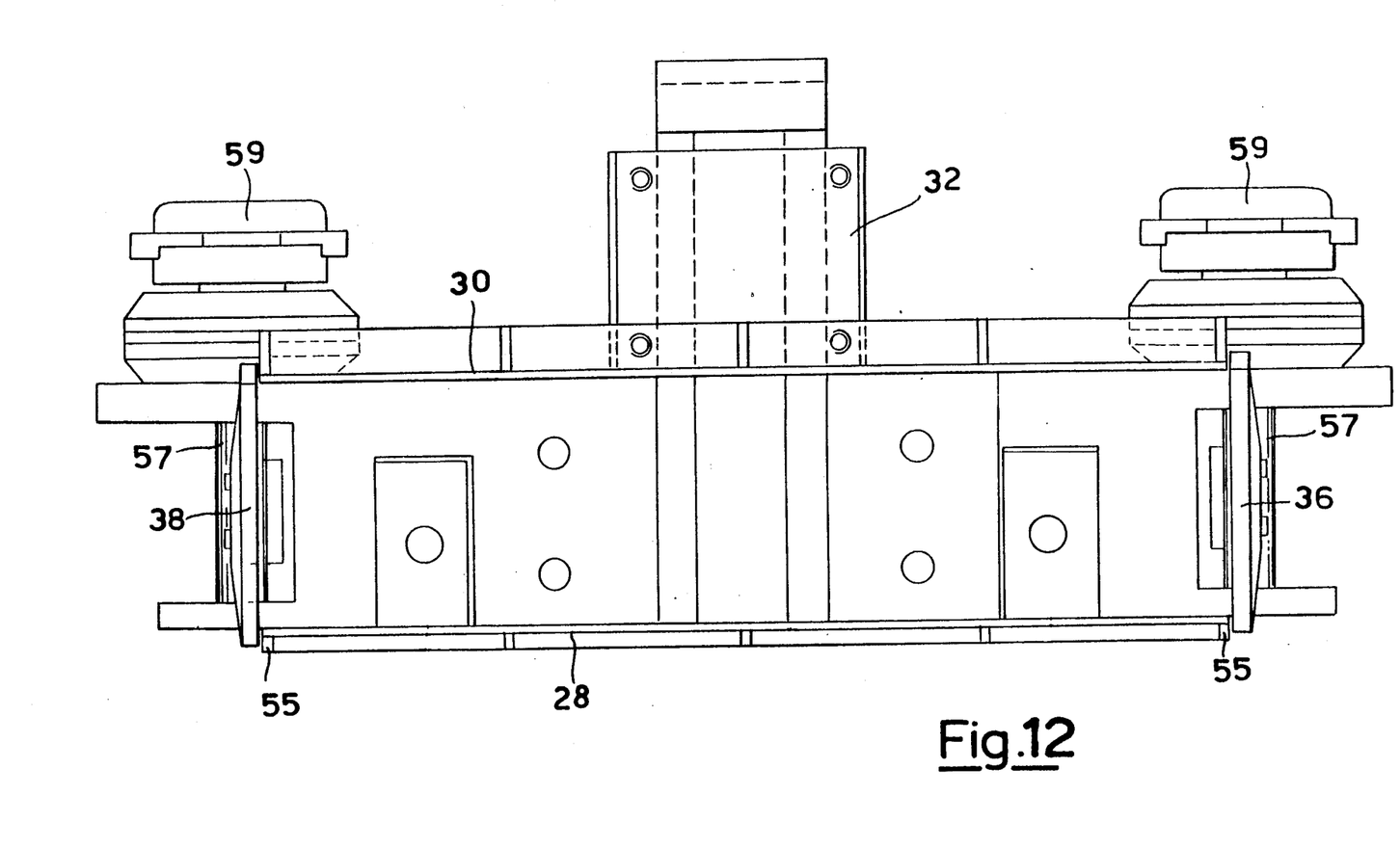
FIG. 12 is a front view of the forward portion of the plier of FIG. 10.

When the plier 24a draws a ream of sheets from a store by means of the jaws or plates 28, 30 as substantially previously indicated with regard to FIGS. 2 and 4 sheltering them in the cavity 40, the lateral panels 36 and 38 are brought into the operative position of FIGS. 11 and 12 (possibly the movable jaw 30 is moved away by a short displacement which is enough to reduce a little its pressure on the ream).

At the same time the stepping motor 59 imparts to the lower panels 36, 38 an impacting movement against the lateral edges of the ream and/or both jaws or plates.

In this way the sheets which make up the reams receive the desired unpacking with respective edges perfectly aligned with each other, ready to undergo further treatments.

Figure 14:
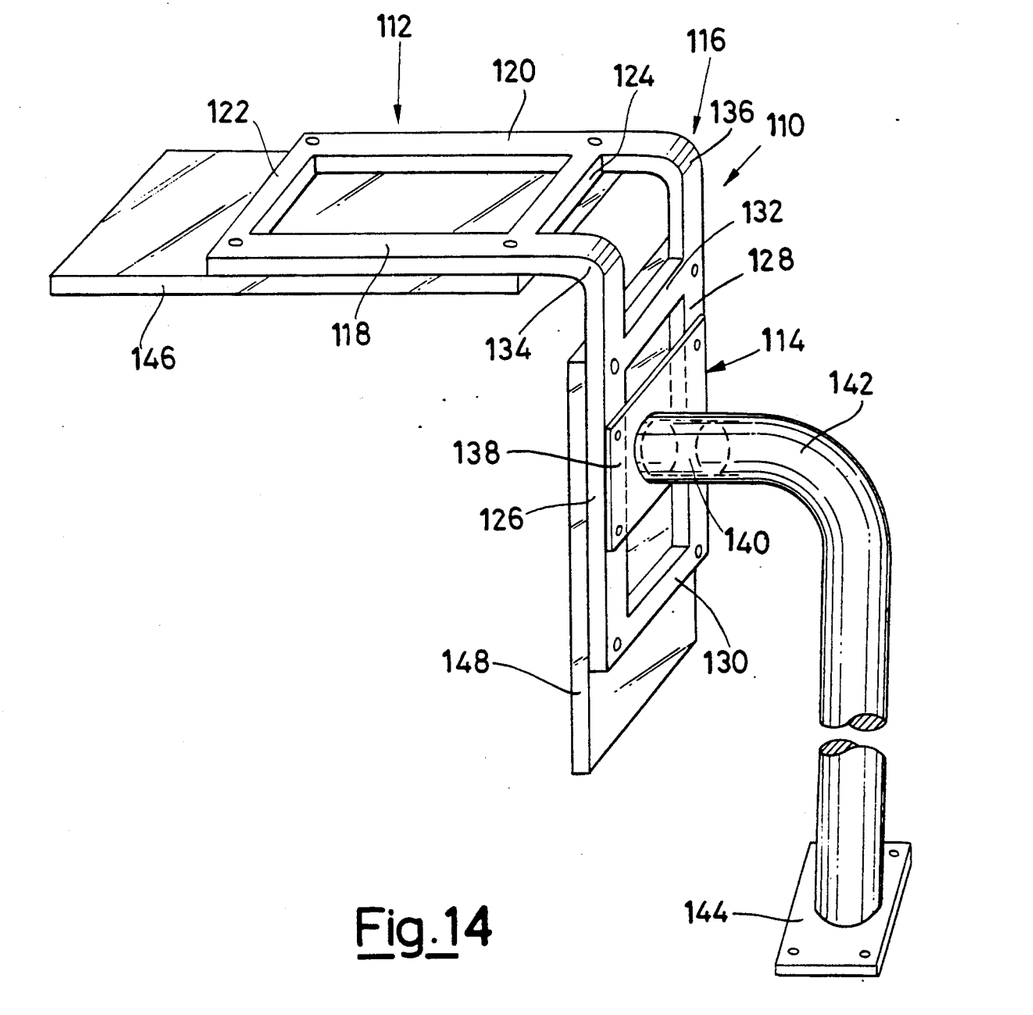
FIG. 14 is a partially shortened perspective view of an embodiment of a static device for realignment of reams applicable to the present invention.
Figure 15:
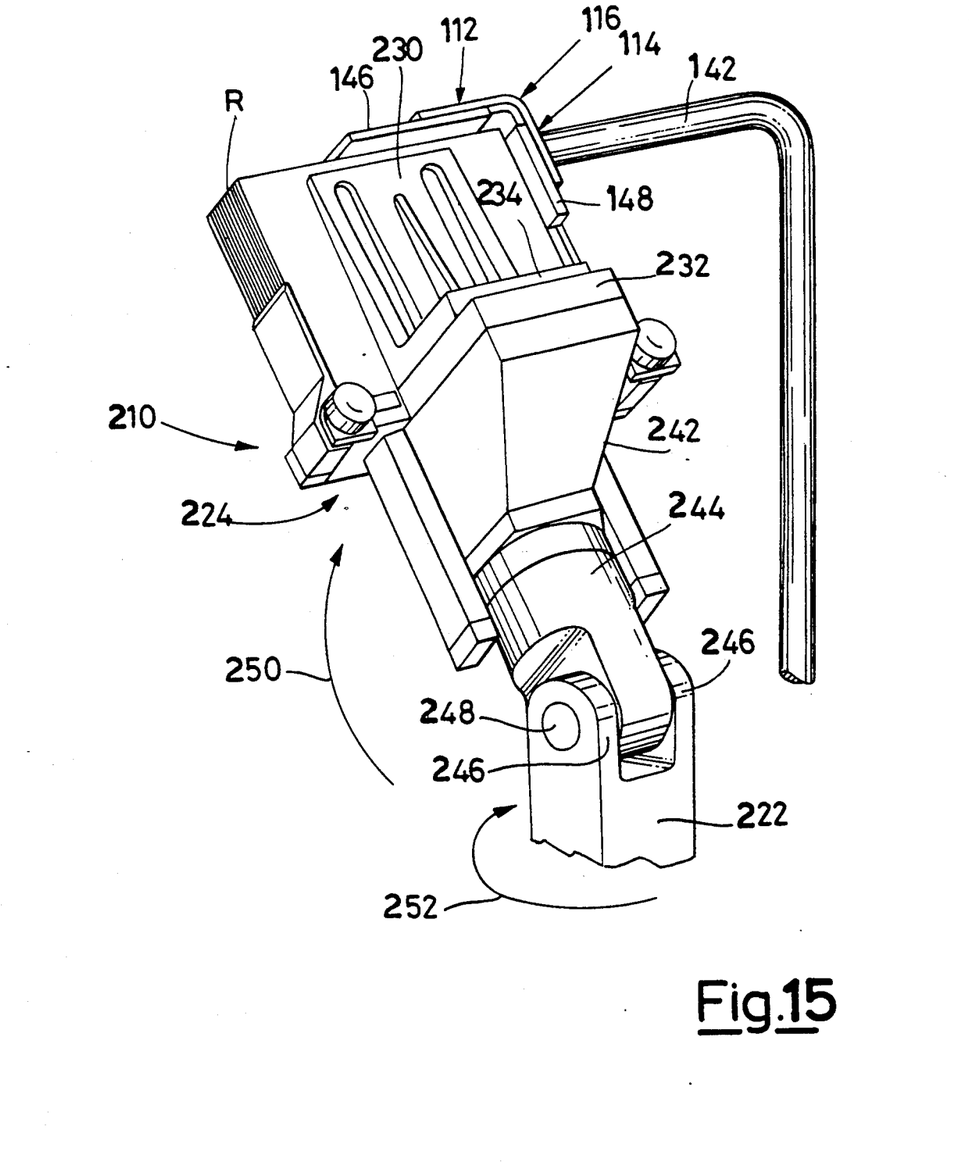
FIG. 15 is a perspective view of the device depicted in FIG. 14.

Considering now FIGS. 14 and 15 it is seen that the auxiliary realignment static device consists in a small square frame 110 including two reciprocally perpendicular branches connected with a corner or an angle member 116.

The branch 112 comprises two longitudinal rods 118 and 120 connected by means of two crosspieces 122 and 124, and the branch 114 comprises two longitudinal rods 126 and 128 connected by means of two crosspieces 130 and 132 and the corner or angle member 116 comprises two crosspieces 124 and 132 respectively.

Corner angles 134, 136 are connected respectively with longitudinal rods 118, 126 and longitudinal rods 120, 128. On the branch 114 of the small frame 110 is fastened a plate 138 provided with anchoring column 140 engaged in an arm 142 which may have any shape, like the elbow shape illustrated in FIG. 14, ending with a fastening flange 144.

On branch 112 of the small frame is fastened a plate 146 of transparent material, which may be glass or some plastic material (highly transparent plastic material), like polycarbonate, because of its features of lowest brittleness together with stoutness and relatively high scratching strength). Similarly to branch 114, there is fastened the plate 148, also of transparent material of the same kind as the one for plate 146. The reason it is preferred to use two transparent plates 146 and 148 on the two branches 112 and 114 of small frame will become readily apparent from the explanation of the operation of the device.

A way to apply or use the present invention can be understood from FIG. 15, wherein it is applied to a movable plier for transport, unpacking, and alignment of reams of paper like the one of FIG. 4.

For convenience, in FIG. 15 the same reference numeric symbols have been adopted as in FIG. 4, but with the digit 2 preceding the reference numeral used in FIG. 4.

As here seen, a robot 210 includes an arm 222 ending with plier means 224 capable to grasp a ream of paper R, including two jaws, between which is visible the L shaped jaw 230, movable through a side 234, slidably along a supporting bracket 232. The bracket 232, in turn, is supported by a box 242 which by means of an eyelet pin is engaged between the eyes 246 of the arm 222 crossing by a turning pivot 248, allowing turning movement of the plier means 224 according to the arrow 250, while another turning movement is carried out by the robot arm 222 according to arrow 252.

The operation of the device is as follows:

As seen in FIGS. 14 and 15, on the small square frame 110 are mounted two transparent plates 146 and 148 addressed to press against a ream of paper, as the ream R of FIG. 15, with an outer corner of the ream inserted into the angle member 116 of the small frame 110. Both transparent plates 146 and 148 allow to perceive the bearing of the ream R against the realignment device and estimate the realignment or possible misaligned single sheets. Moreover, the space left free by both plates 146 and 148 in the angle member 116 permits it to enter, as already said, into an outer corner of the ream and estimate through the window limited by the crosspieces 124 and 132 and by the square rods 134 and 136 the correct alignment of the corner of the ream housed therein.

In case ream R is contained in plier means 224 supported at the end of a robot arm 222, it is sufficient that the movable jaw 230 does not hold too firmly the ream R and that at first the plier means 224 moves according to the movement indicated by the arrow 250 and afterwards; it moves the robot arm 222 according to the movement indicated by the arrow 252 in order to have ream R pressed against the realignment device, reaching a correct levelling or realignment of all its single sheets.

The invention has been described in relation to its preferred embodiment, and it is understood that conceptually and mechanically equivalent modifications and variations are possible and expectable without departing from the scope thereof.

For example, the transparent plates 146 and 148 could be replaced with two metallic plates provided with square or rectangular holes sufficiently large as to have them resemble grills, having just the shrewdness to give a smooth finish to the surfaces addressed to meet the ream of paper for reaching the same result to make the edges of the ream sufficiently visible and operate a correct realignment thereof, as well as to hold the corner of the ream occurring at the device corner away from the angle member 146 and, especially, from square rods 134 and 136.

I claim:

1. Automatic service apparatus for fast printers (10), comprising:
    a mechanical robot arm (16) including plier means (24) movable among a plurality of positions;
    a store (12) containing at least one ream (R) of paper to be printed and having along one protruding edge thereof a substantially horizontal surface of a predetermined distance, and said robot arm (16) with said plier means being in one of said plurality of positions for drawing said at least one ream (R) from said store (12) at said protruding edge;
    said plier means (24) including a pair of spaced planar members (28, 30) and lateral clamps (36, 38) for defining a box cavity (40) and said robot arm (16) being movable to a second position of said plurality of positions and being inclined upwardly with respect to said cavity (40) for anti-adhesive unpacking operations and alignment of sheets along one edge of said box cavity;
    said robot arm (16) being movable to a third position of said plurality of positions for depositing said ream (R) into a feeding seat of said fast printer (10), and movable to a fourth position of said plurality of positions for withdrawing a prefixed number of sheets outcoming from said fast printer (10) for transfer of said prefixed number of sheets to an after-treatment station (60);
    said plier means including first means for providing said lateral clamps (36, 38) for said cavity (40) and second meass (74, 76) for imparting a vibratory movement to walls of said cavity when said robot arm is in said second position; and
    third means (64) for reciprocally moving said planar members (28, 30) towards and away from each other.

2. The apparatus according to claim 1, wherein said store (12) includes a set of pigeon-holes comprising as many boxes (14) as may be sufficient to provide for an operating autonomy of time for the served fast printer (10) so that said store (12) can be replaced with another similar store.

3. The apparatus according to claim 1, wherein said mechanical robot arm (16) includes a base (18), a first arm (20) articulated on said base (18) and movable for rotation about a first vertical axis passing through said base (18), a second arm (22) articulated on said first arm (20) and movable around a second axis perpendicular with respect to said first vertical axis, and said plier means (24) being articulatedly mounted on an outer end of said second arm (22), said mechanical robot arm (16) being operative by moving said first and said second arms (20 and 22) thereof to bring said plier means (24) in front of at least said store (12) and said printer (10).

4. The apparatus according to claim 3, wherein said base (18) is motorized for displacement and mounted on a rail (26) for movement of said robot arm (16) around said printer (10).

5. The apparatus according to claim 3, including an eyelet pin (44) for articulation of said second arm (22), said eyelet pin (44) protruding from said plier means (24) and being inserted between two trunions (46) and integral at another end of the second arm (22), and a pivot pin (48) crossing said two trunions (46) and said eyelet pin (44).

6. The apparatus according to claim 5, wherein said plier means (24) is formed by said two spaced planar members (28, 30) for forming plate supporting jaws, said spaced planar members (28, 30) forming parallel and horizontal planes, a first jaw (28) being fixed to a supporting bracket (32), and said supporting bracket being mounted on an intermediate box (42) containing manoeuver mechanisms for said plier means (24) and connected to said eyelet pin (44).

7. The apparatus according to claim 6, wherein said third means (64) for moving said planar members (28, 30) comprises a double-acting cylinder having a piston stem (66) for operating a slide (68) fixed at one side (34) of a second jaw (30).

8. The apparatus according to claim 6, wherein said cavity (40) is defined by said planar members which form spaced jaws (28, 30) and by said supporting bracket (32), and said cavity (40) is provided with a feed-out device for the ream (R) of paper comprising a sheet-presser (52), extending for the whole height of a side of the ream, and a stem (50) operated by a piston (70) slidable within a cylinder (72).

9. The apparatus according to claim 6, including said second means (74, 76) for providing vibrating movement to the walls of said cavity (40) comprising resilient pads, between said supporting brackets (32) and an intermediate box (42), for transforming shifting movements of said bracket (32) into vibrating movements.

10. The apparatus according to claim 6, including temporary lateral clamping means (36, 38) for said cavity (40) bracket (32) and rotatable about 180 degrees to move from an open position to a closed position.

11. The apparatus according to claim 7, wherein said lateral clamps (36, 38) are formed by two lateral panels hinged to said first jaw (28) and rotatable about 180 degrees by means of a motor (78) and belt drives (80, 82) to move from an open position to a closed position.

12. In a service printer apparatus according to claim 1, a realignment device for reams (R) of paper comprising a square support provided to press on two adjacent and reciprocally perpendicular faces of a ream (R) without pressing on its corner and allowing possibility for examination of the pressed faces.

13. In the apparatus according to claim 12, wherein said square support comprises a square supporting frame (110) having a frame angle, including two perpendicular branches (112, 114), two transparent support plates (146, 148) arranged on said two branches (112, 114), respectively, and reciprocally spaced in order not to touch each other along corresponding corners at an angle (134, 136) of said square frame (110) and thereby to allow one corner of the ream (R) to penetrate within said frame angle.

14. In the apparatus of claim 13, wherein said two transparent supporting plates (146, 148) are two glass sheets secured by means of screws to said supporting frame (110).

15. In the apparatus according to claim 13, wherein said transparent supporting plates (146, 148) are two sheets of transparent plastic materials.

16. In the apparatus according to claim 15, wherein said transparent plastic materials are polycarbonate resin.

17. In the apparatus according to claim 12, wherein said support plates (146, 148) are made from metallic plates with substantially smooth support surfaces and are provided with apertures for allowing an examination of the edges of the ream (R) pressed from the same plates.

18. In the apparatus according to claim 17, wherein said metallic plates are provided with rectangular aligned apertures and close to each other to assume the appearance of metallic grills having finished smooth bearing surfaces.

19. In the apparatus according to claim 18, wherein said apertures of the plates are square.

20. In a service printer apparatus comprising,
a mechanical robot arm (16) including plier means (24) movable among a plurality of positions;
a store (12) containing at least one ream (R) of paper to be printed and having along one protruding edge thereof a substantially horizontal surface of a predetermined distance, and said robot arm (16) with said plier means being in one of said plurality of positions for drawing said at least one ream (R) from said store (12) at said protruding edge;
said plier means (24) including a pair of spaced planar members (28, 30) and lateral clamps (36, 38) for defining a box cavity (40) and said robot arm (16) being movable to a second position of said plurality of positions and being upwardly inclined with respect to said cavity (40) for anti-adhesive unpacking operations and alignment of sheets along one edge of said box cavity;
said robot arm (16) being movable to a third position of said plurality of positions for depositing said ream (R) into a feeding seat of said fast printer (10), and movable to a fourth position of said plurality of positions for withdrawing a prefixed number of sheets outcoming from said fast printer (10) for transfer of said prefixed number of sheets to an after-treatment station (60);
said plier means including first means for providing said lateral clamps (36, 38) for said cavity (40) and second means (74, 76) for imparting a vibratory movement to walls of said cavity when said robot arm is in said second position; and
third means (64) for reciprocally moving said planar members (28, 30) towards and away from each other;
said plier means comprising:
a plier including said two planar members defined by two parallel plates, one of said parallel plates being a first fixed plate (28) and the other of said parallel plates being a second movable plate (30) movable in a direction perpendicular to said first fixed plate (28); and
said first means (36, 38) including said lateral clamps forming two lateral panels (36, 38) rotatable around a hinge axis (57) to contain said ream of sheets (R), at least one of said panels (36, 38) including at least an envelope (41) connected to an air intake (43), said envelope (41) having a plurality of apertures directed to said ream (R) of sheets to convey air jets against an edge of said ream (R) of sheets.

21. In the printer apparatus according to claim 20, wherein said envelope (41) is made up of a series of small pipes (45) parallely connected by at least one manifold (47).

22. In the apparatus according to claim 20, wherein said plier has apertures that are small holes (49).

23. In the apparatus according to claim 20, wherein said panels (36, 38) each include at each side thereof an envelope (41).

24. In the apparatus according to claim 20, wherein said air intake (43) is controlled by an electric valve.

25. In the apparatus according to claim 20, wherein each of said panels (36; 38) in its operative position convey said air jets against a corresponding edge of the ream of sheets (R) for providing a striking movement against said plates (28, 30).

26. In the apparatus according to claim 25, including a stepping motor (39) for transmitting said striking movement to one of said panels (36, 38) by means of a rigid extension (39) which connects said panels (36, 38) with its hinge axis (57).

27. In the apparatus according to claim 25, wherein said striking motion is produced by a pneumatic double-acting piston-cylinder system and transmitted to one of said panels (36 or 38) by means of a rigid extension (39) connecting said panels (36, 38) with its hinge axis (57).

* * * * *